Feb. 5, 1957  A. HUET  2,780,000
METHOD OF THICKENING TUBE WALL
Filed July 16, 1951  2 Sheets-Sheet 1
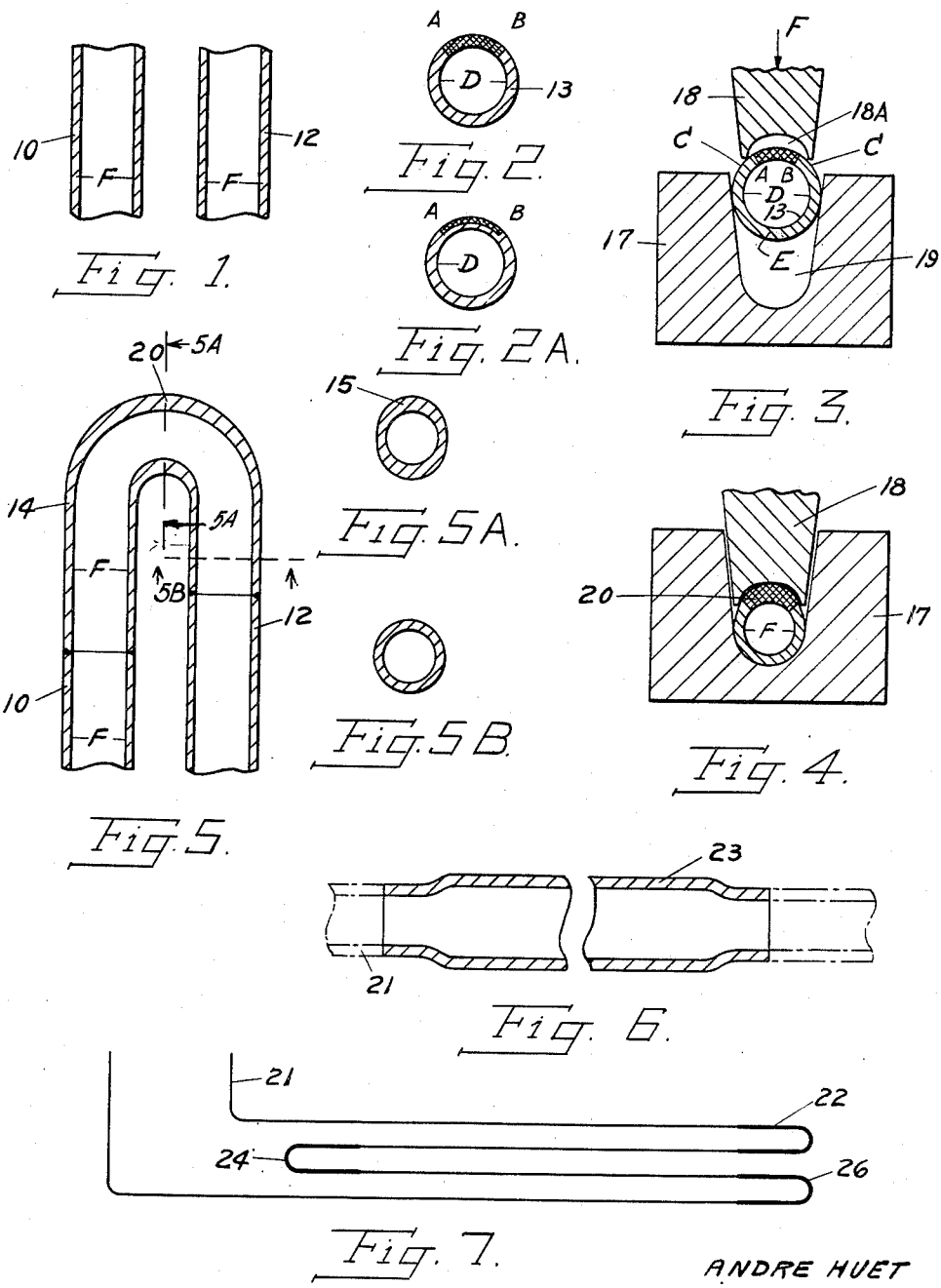
ANDRE HUET
INVENTOR.
BY James J. Whalen
ATTORNEY

United States Patent Office 2,780,000
Patented Feb. 5, 1957

2,780,000

METHOD OF THICKENING TUBE WALL

André Huet, Paris, France, assignor to Combustion Engineering, Inc., New York, N. Y., a corporation of Delaware Application July 16, 1951, Serial No. 237,014

1 Claim. (Cl. 29—534)

The present invention relates to a method of working a cylindrical tube to produce an increased thickness over a certain length and on one or several segments of its periphery. Subsequently this region of tube of increased thickness is formed into an elbow or may be utilized to form longitudinal fins.

A problem which frequently arises is that of obtaining a cylindrical tube having locally an increased thickness on a portion of its periphery. For example, it may be desired to join a straight tube having a thickness of 3.5 mm. and an internal diameter 23 mm., to an elbow, made from a portion of tube having the same thickness of wall, that is to say 3.5 mm., but which is widened on the portion which is so bent so that its internal diameter is greater, for example 30 mm. According to the invention, a tube having an internal diameter greater than that of the final piece is heated along a certain longitudinal segment and subjected to a forging, for example, between a suitable die and punch so as to obtain a permanent deformation of the cold part which produces a diminution of the diameter of the tube. This deformation exerts a compression of the heated part which produces an enlargement of the wall or an increased thickness in the heated segment of the tube. The portion of the tube thus treated is bent to form an elbow in such a way that the part of increased thickness is on the outside of the elbow of desired angle having an increased thickness at its top or tip only, but the internal diameter of which is that of the straight tube to which it is to be joined.

Instead of joining the elbow thus made onto the straight portions of a tube, the straight tube itself is treated in the desired regions over a certain length, so as to increase its external diameter as well as its internal diameter. This may be done even without changing its thickness, according to a method described in my earlier application, dated June 25, 1951, and bearing Serial No. 233,358, after which the widened parts are subjected to further operations which comprise the method which is the particular subject of the invention.

The heating of the tube may be effected by any suitable means, for example, by electric induction, a method which makes it possible to obtain a high degree of heating very rapidly on a closely determined region and to the desired depth.

It is likewise provided that, during the stamping one can introduce inside of the tube a mandrel.

Figure 1 shows two tubes to be joined as parallel branches of a return bend that includes an elbow made according to the invention.

Figure 2 is a cross section of a tube from which one starts in order to make the elbow.

Figure 2A is a variant of Figure 2.

Figures 3 and 4 are sectional views showing the tube in working dies before and after stamping according to the present invention.

Figure 5 is a sectional view of the elbow joined to the two parallel tube branches.

Figures 5A and 5B are sections on corresponding section lines of Fig. 5.

Figure 6 shows in longitudinal section an enlarged portion of tubing produced according to a prior invention of applicant.

Figure 7 is a diagrammatic view showing a tubular heat exchange element with several bends according to the invention.

Figure 8:
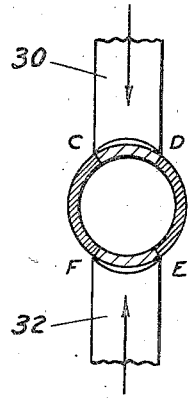
Figures 8 to 10 show diagrammatically the various phases of stamping a tube to produce two symmetrically located portions of increased thickness.

It is proposed according to the invention, to join the two tubes 10, 12 (Figure 1) together as parallel, branches of an 180° return bend by means of an elbow 14 of increased wall thickness at its tip. For this purpose a tube length 13 (Fig. 2) of a wall thickness equal to that of tubes 10, 12, but having along a certain portion of its length an internal diameter D which is greater than that of the entire tube length. According to the present invention, the portion of enlarged diameter of the tube 13 is heated longitudinally along a certain arcuate segment AB shown finely cross-hatched in Fig. 2. The heating may not affect the entire wall thickness of the tube in this region, as shown in Fig. 2A. The heated portion of the tube 13 is then introduced into a die 17 as shown in Fig. 3 and with the aid of a punch 18 which rests on cold parts C of the tube 13 at both sides of the segment AB, a pressure is exerted in the direction of the arrow F. The shape of the recess 19 in the die 17 is such that the larger sector AEB of the tube which has remained relatively cold is, by being pressed down into the die cavity 19, subjected to a deformation which has the effect of restoring to it the internal diameter F of tubes 10, 12 as shown in Fig. 4. This deformation also has the effect of exerting on the heated segment AB a pressure which causes a swelling of the tube wall to produce an increased thickness of the wall of the tube; this swelling 20 lodges in a suitable recess 18A provided at the end of the punch 18 as seen in Figure 3. The recess 18A in which the increased thickness 20 lodges could alternatively be provided in the die at its lower part by placing the heated segment AB toward the bottom at 180 degrees from the position shown in Figures 3 and 4. In this last case the punch 18 would rest only on the most resistant and cold parts of the tube and the reinforcement of the wall originates in the zone which is least subjected to the dynamic actions of the process.

During the stamping operation a cooled or heat-insulated mandrel might be placed inside of the tube; or a current of cold fluid, air or water could be passed through this tube, which has the effect of increasing the rigidity of the cold part AEB.

One can also provide an internal recalibrating of the tube 13 after stamping in such a way that the internal section of the tube is circular.

The tube with a thickened wall portion on one side thus obtained is then bent, according to any known method, in such a way as to finally obtain the elbow 14 shown in Figure 5, of a diameter corresponding to tubes 10, 12, the increased wall thickness 20 being in the outer region or tip of the elbow, as shown in Figures 5 and 5A.

The method which has just been described requires the joining of the bent tube 14 onto the straight portions 10, 12. It is provided, according to the invention, that there can be obtained an elbow integral with tubes 10, 12 by enlarging a tube at the desired places to the suitable external and internal dimensions, without increased thickness, as shown at 23 in Fig. 6. This is disclosed in my prior application Serial No. 233,358, filed June 25, 1951.

When one has to make, for example, a heat exchanger or superheater element made up of a certain length of tube having for example three hair pin elbows as shown in Fig. 7, the tube 21 is first enlarged in diameter, as shown in Fig. 6, at the desired places 22, 24, 26. Then these enlarged regions are subjected to the series of operations shown in Figs. 3 and 4 and then bent in such a way as to obtain finally a single-piece element having three elbow return bends. It will be noted, in fact, that the method which is the subject of the invention may be applied at any point whatever of the length of a straight tube to produce a region of increased wall thickness.

Figure 9:
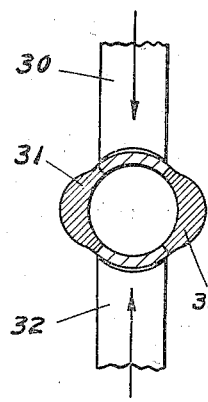
Figure 10:
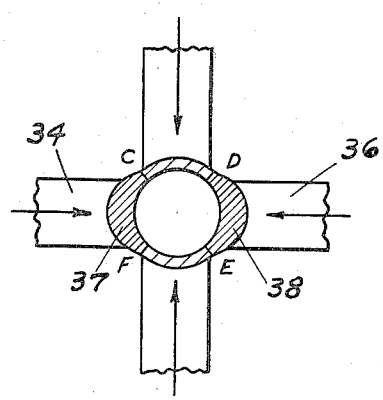

A tube which is circular on the inside with the outer profile ovalized or ellipsoidal is shown diagrammatically on Figs. 8 to 10. Starting from a tube of which the diameter is, as before, slightly greater than the internal diameter of the final tube which it is sought to obtain, this tube length is heated along two sectors DE, CF. Onto segments CD and FE which have remained cold, there are then applied two punches 30, 32 moving in opposite directions. The compression which is exerted on the heated segments has the effect, after the punches 30, 32 are moved together, of causing two swellings 31, 33 (Figure 9) diametrically opposite each other on the periphery of the tube.

After this and suitable further heating, if desired, two other punches 34, 36 are applied at a right angle onto the swollen parts 31, 33 in such a way as to cause the deformation of segments CD, FE. One obtains a tube whose outer profile is ovalized or ellipsoidal with two increased thicknesses 37, 38 and the internal section of which is circular. The movement of the two punches 34, 36 can be simultaneous with the movement of the two punches 30, 32, the whole of the operation being thus effected at a single stroke.

Figure 11:
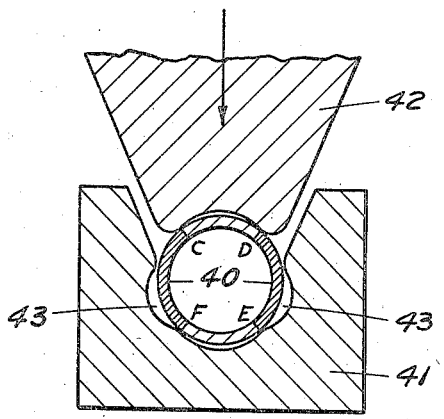
Figures 11 and 12 are sectional views of stamping dies of different type for producing two symmetrically located portions of increased thickness.
Figure 12:
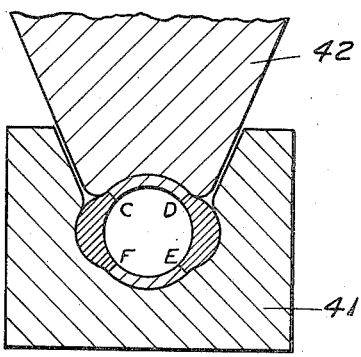

In one variant of this process a tube having two diametrically opposite increased thicknesses is produced by a process similar to that which has been described with respect to Figs. 3 and 4, with the difference that in this case, the effect produced by the punch acts on the cold segments of the periphery of the tube. The swelling of the wall is effected in the recesses provided in the die. As may be seen on Figs. 11 and 12, the tube 40 heated along the two segments DE and CF is placed inside of a suitable die 41 profiled as shown and the mobile punch 42 is applied on the upper part of the tube. Under the effect of the pressures exerted by the punch in the direction of arrow L, the hot parts CF, DE are swollen and the increased thicknesses thus produced enter the recesses 43 provided in the die 41 (Fig. 12) whereas the segments CD, FE which have remained cold are deformed and brought to the desired diameter by the suitable shape given to the supporting surfaces 43, 44 of the die 41 and the punch 42.

The heated part AB of the tube, shown in Fig. 3 instead of being placed at the upper part which receives the blow of the punch, or as has been described above by way of a variant, at the lower part in the die 17 can also be placed in the zone in which the punch at the end of its stroke comes the closest to the die. It is this arrangement in fact, which is shown on Figs. 11 and 12, in which the hot segment such as DE or CF is at the height of the junction where the punch meets the die. It may be seen that, in this case, the stresses of action of the punch and of reaction of the die work practically on the same straight line parallel to a tangent of the tube, in such a way that these stresses work directly in the heated mass of segment DE vertically, which considerably reduces the chances of corrugation during forging.

Of course, the same results may be obtained by using rollers or cylinders, the grooves of which should have profiles corresponding to those of the dies and punches described as doing the work, or by any useful combination of dies or punches and rollers to assure a continuous operation.

What I claim is:

The method of fabrication of a cylindrical tube with inside circular sections showing on a certain length and on a certain sector of its periphery an extra-thickness, obtained by heating the tube and conformation of this latter in suitable matrices, characterized by; providing a tube of uniform thickness and of the same internal diameter as the tube finally to be obtained; submitting the length of the tube to be treated to a compression in the axial sense so as to create a hollow circumferential bulge and increase the inside diameter of the tube without increasing its thickness; heating longitudinally the length of the tube treated at the sector where an extra-thickness is to be obtained; and, without employing a mandrel or internal support, compressing that portion of the empty tube treated between two matrices acting from outside to oblige the tube sector that remained cold, to exert on the heated sector a compression decreasing the diameter of the empty tube bringing it back to its original internal diameter, and creating at the same time an extra wall thickness in the sector which is heated.

References Cited in the file of this patent

UNITED STATES PATENTS

| | | |
|---|---|---|
| 1,259,275 | Murray | Mar. 12, 1918 |
| 1,339,970 | Murray | May 11, 1920 |
| 1,497,398 | Axelson | June 10, 1924 |
| 1,504,764 | Johnson | Aug. 12, 1924 |
| 1,668,442 | Wineman | May 1, 1928 |
| 1,709,998 | Mirfield | Apr. 23, 1929 |
| 1,727,896 | Mraz | Sept. 10, 1929 |
| 1,759,416 | Pleister | May 20, 1930 |
| 2,178,141 | Frame | Oct. 31, 1939 |
| 2,222,762 | Debor | Nov. 26, 1940 |
| 2,325,564 | Westin | July 27, 1943 |
| 2,347,957 | McCullough | May 2, 1944 |
| 2,507,859 | Keller | May 16, 1950 |